(12) United States Patent  
Adams

(10) Patent No.: US 8,042,673 B2
(45) Date of Patent: Oct. 25, 2011

(54) AXIALLY COMPLIANT CLUTCH DEPARTURE CONTROL SLEEVE

(75) Inventor: Barry Thomas Adams, Leo, IN (US)

(73) Assignee: Eaton Corporation, Cleveland, OH (US)

( * ) Notice: Subject to any disclaimer, the term of this patent is extended or adjusted under 35 U.S.C. 154(b) by 545 days.

(21) Appl. No.: 12/324,427

(22) Filed: Nov. 26, 2008

(65) Prior Publication Data

US 2010/0126821 A1     May 27, 2010

(51) Int. Cl.
*F16D 13/75*     (2006.01)
(52) U.S. Cl. .............................. 192/70.252; 192/111.18
(58) Field of Classification Search ............. 192/70.252, 192/111.18, 111.19, 111.2, 111.4
See application file for complete search history.

(56) References Cited

U.S. PATENT DOCUMENTS

| | | | |
|---|---|---|---|
| 2,385,517 A | 9/1945 | Hunt | |
| 5,404,979 A * | 4/1995 | Craft et al. ............... | 192/70.252 |
| 5,564,541 A * | 10/1996 | Gochenour et al. ..... | 192/70.252 |
| 5,566,804 A | 10/1996 | Gochenour et al. | |
| 6,070,708 A | 6/2000 | Fukuda et al. | |

\* cited by examiner

*Primary Examiner* — Richard M. Lorence
(74) *Attorney, Agent, or Firm* — Rader, Fishman & Grauer PLLC

(57) ABSTRACT

A torque transmitting apparatus includes a cover portion generally defined by a first axis. The cover portion includes a plurality of adjustment apertures. The apparatus also includes a flywheel coupled to the cover portion for rotation therewith, wherein the flywheel is restrained from axial movement relative to the cover portion. The apparatus also includes a pressure plate coupled to the cover portion for rotation therewith. The pressure plate is axially moveable relative to the cover portion. The apparatus also includes a clutch disk at least partially interposed between the flywheel and the pressure plate. The apparatus also includes a plurality of first members extending between the pressure plate and the cover. Each first member exerts a biasing outward radial force on the adjustment aperture to resist axial movement therebetween. A portion of the first member exerts a biasing axial force on the pressure plate thereby biasing the pressure plate toward the flywheel.

20 Claims, 10 Drawing Sheets

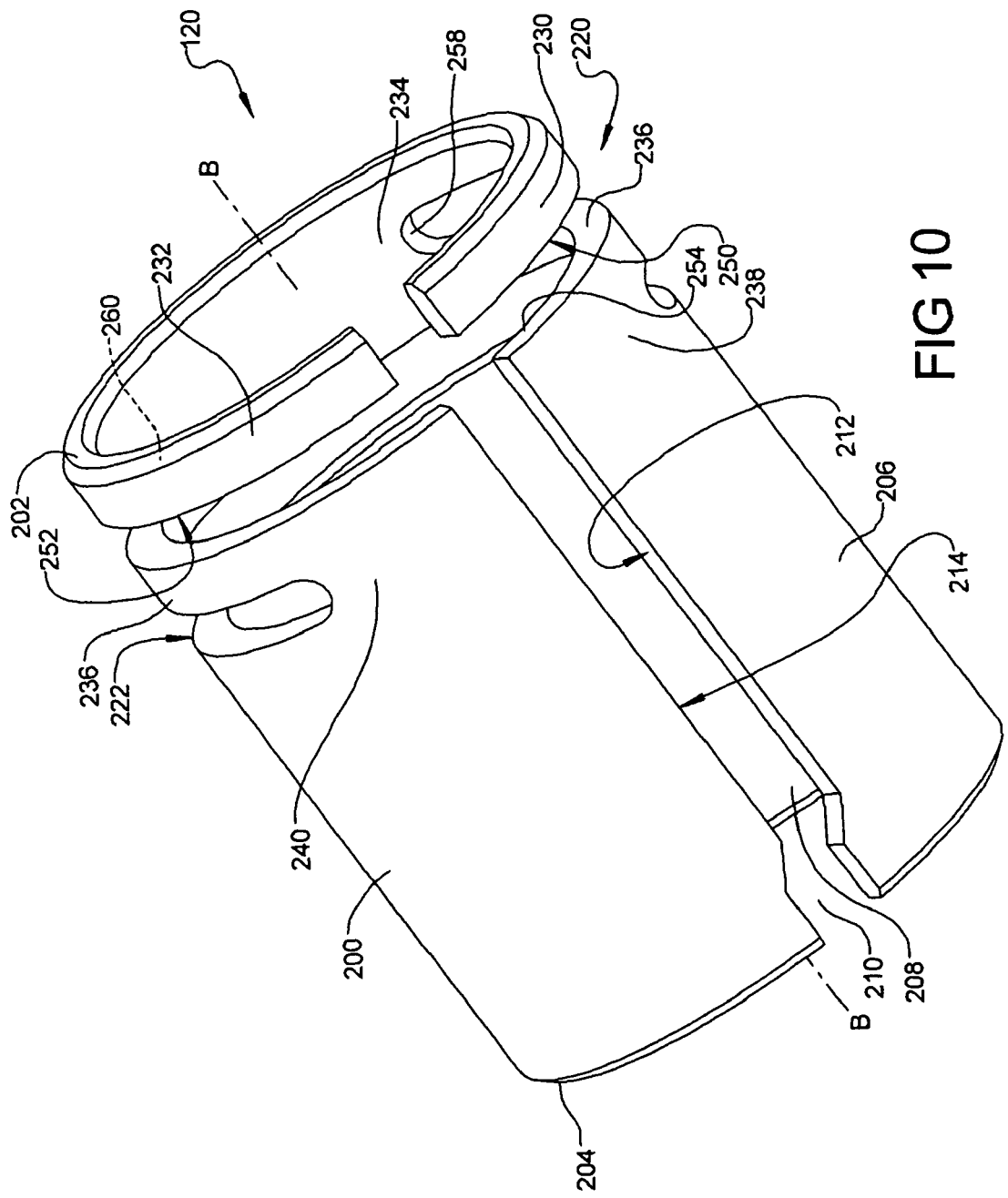

AXIALLY COMPLIANT CLUTCH DEPARTURE CONTROL SLEEVE

TECHNICAL FIELD

The disclosure generally relates to clutches for transmitting torque in automobiles.

BACKGROUND

A friction clutch or brake includes an engaging member having a friction surface that wears over the life of the device. In order for the friction torque device to continue operating effectively, the relative position of the engaging members must be adjusted or realigned to compensate for wear that occurs on the friction surface.

More specifically, in a friction clutch, torque is transmitted from a driving member to a driven member, each member rotating about an axis. The driven member is interposed between the driving member and a pressure plate. In normal operation, a release assembly cooperates with the pressure plate to selectively move the pressure plate axially towards the driven member in order to engage and disengage the clutch. As wear occurs on a friction surface of the driven member, the pressure plate must be moved an additional axial increment to engage the driven member with the driving member. The relative position of the pressure plate must therefore be compensated internally for this additional increment of movement.

With most heavy duty friction clutches, the adjustment of a release bearing and spring assembly is manually achieved in order to compensate for wear on the friction surface of the driven member. Manual adjustment, however, requires continuous monitoring to determine if adjustment is necessary, as well as manpower to perform the adjustment. If the adjustment is not timely completed, the clutch will operate less effectively.

It is also known to provide a clutch with an automatic adjustment mechanism. While a number of such mechanisms do compensate for wear, numerous parts are typically required for the desired result. Further, the operative parts are frequently disposed outside the cover of the clutch, thereby subjecting the parts to possible damage and an increased likelihood of breakdown. More significantly, prior art automatic adjustment mechanisms often do not fully, or timely compensate for wear on the friction surface. This is due, in part, to incomplete adjustment, or delayed adjustment after the friction surface has worn.

Accordingly, a need exists to provide a friction torque device with an automatic adjustment mechanism that has a simple structure with a minimum number of interconnected parts, wherein the parts are disposed within a housing or cover for the device. A desirable adjustment mechanism may also provide an automatic adjustment mechanism that directly and effectively adjusts the friction torque device during normal operation while not reducing the operability of the clutch.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIG. 10 is a perspective view of a spring, according to an embodiment.

DETAILED DESCRIPTION

Figure 1:
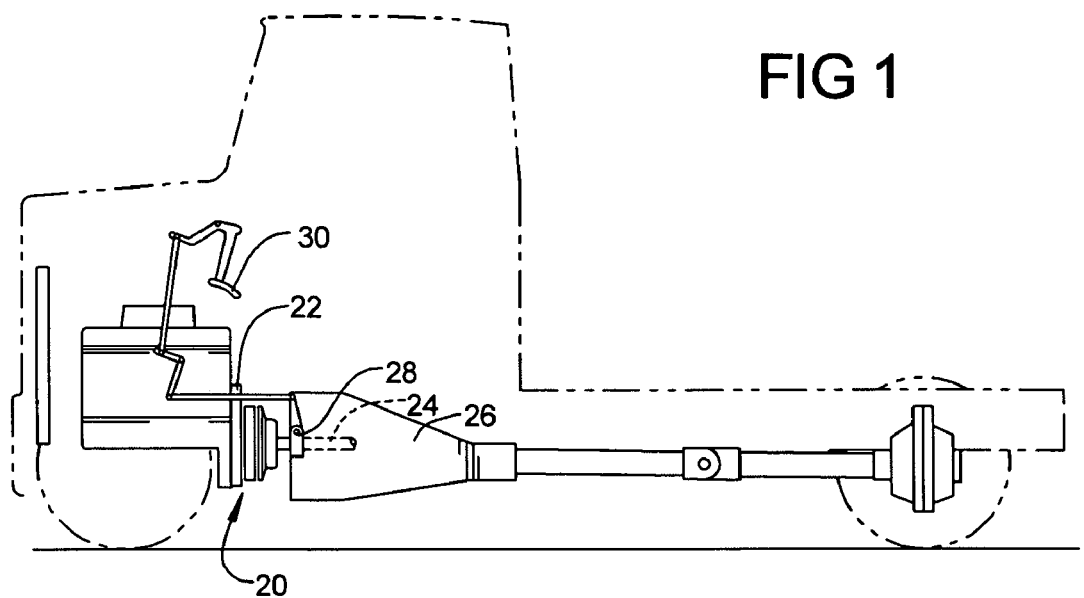
FIG. 1 is a partial phantom view illustrating an automatically adjusting clutch mounted in a heavy duty vehicle.

FIG. 1 illustrates a heavy duty the clutch 20 that selectively transmits torque from an engine flywheel 22 to a driven shaft 24 of a vehicle transmission 26. The flywheel 22 is the driving member providing torque, which is selectively transmitted to the transmission 26. A standard clutch release assembly 28 is employed for affecting clutch disengagement from the flywheel 22. Such movement of the release assembly 28 is achieved by depression of a clutch pedal 30 in a vehicle cab C. The clutch pedal 30 is mechanically linked to the release assembly 28. A full stroke of the pedal 30 will fully disengage the clutch 20, moving the release assembly 28 to an extreme right position (in the direction of the arrow R of FIG. 3).

Figure 2:
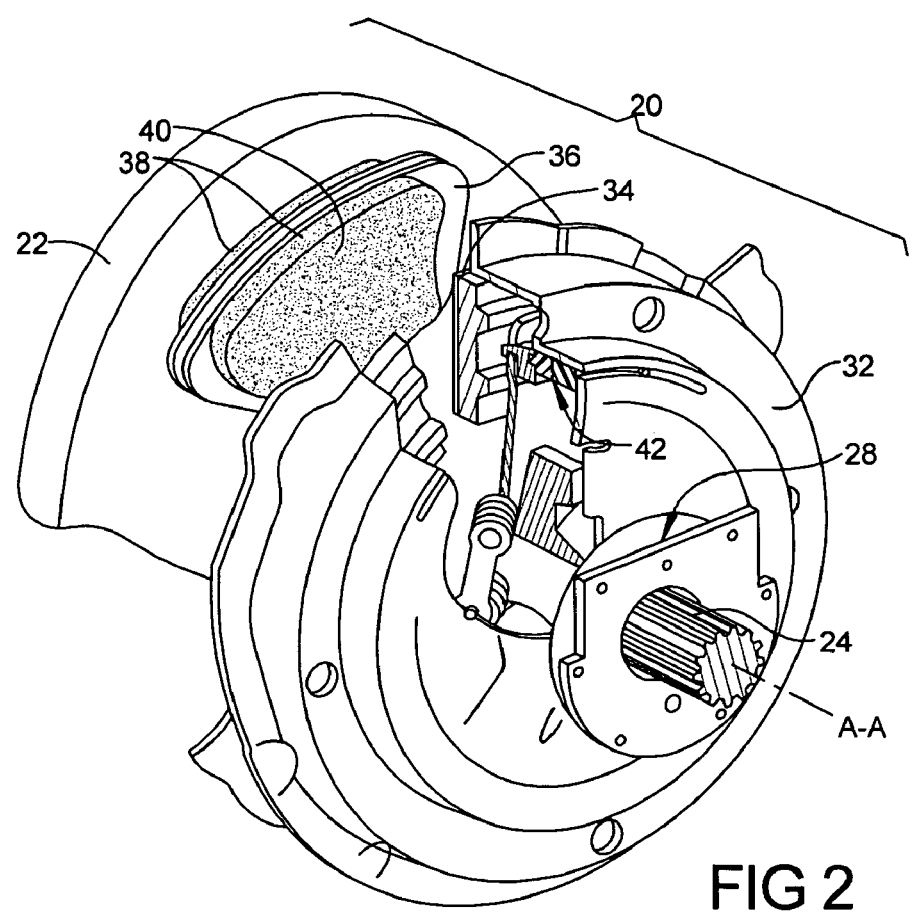
FIG. 2 is a perspective view of the automatically adjusting clutch.
Figure 3:
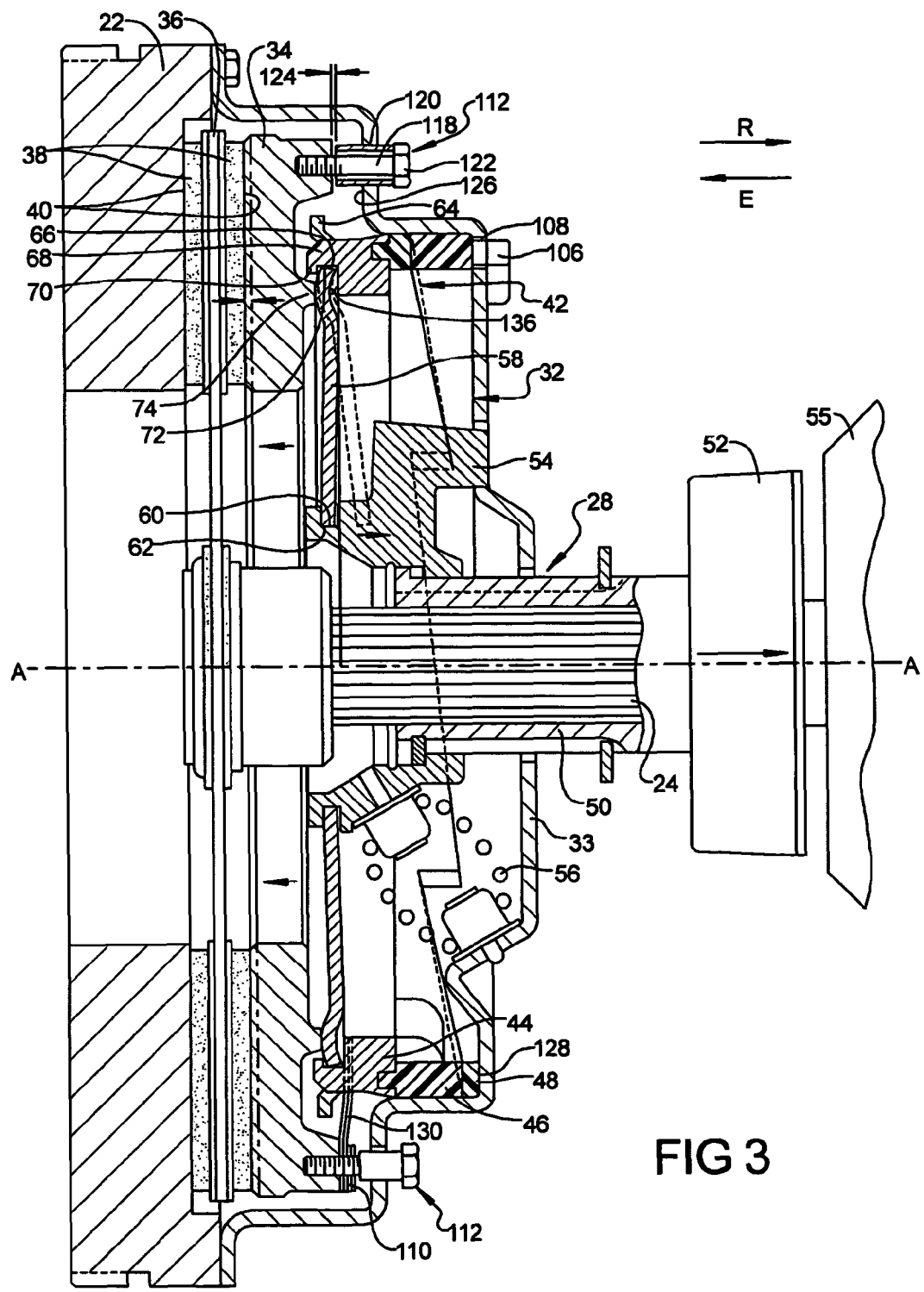
FIG. 3 is a sectional view of the automatically adjusting clutch.

Referring to FIGS. 2 and 3, the flywheel 22 is fixed to a cover 32 for rotation therewith. The cover 32 is in a fixed position relative to the flywheel 22, and includes a radially extending wall 33, which is spaced from the flywheel 22 a fixed distance. A pressure plate 34 and a driven member 36 are sandwiched between the flywheel 22 and the cover 32, which rotate about a drive axis A-A. The driven member 36 is rotationally fixed to the axially extending driven shaft 24. As is known, the pressure plate 34 is selectively moved the left (in the direction of the arrow E of FIG. 3) to frictionally engage the pressure plate 34, the driven member 36 and the flywheel 22 to transmit torque from the flywheel 22 to the driven shaft 24. The driven member 36 includes at least one friction pad 38 on each axial side of the driven member. In FIG. 2, the relative thickness of the friction pads 38 is enlarged to emphasize the effect of wear, which occurs on a friction surface 40 of each friction pads 38 over the life of the clutch 20.

Due to the wear on the friction surface 40, the driven member 36 must be moved to the left (toward the direction of the arrow E) an additional axial distance to engage the flywheel 22. During operation of the clutch 20, and more specifically, when the clutch 20 is fully disengaged, an adjustment mechanism 42 automatically adjusts the clutch 20 to compensate for this wear.

The adjustment mechanism 42 is annular and includes an adjusting ring 44, a left cam ring 46 rigidly secured to the adjusting ring 44, and a right cam ring 48 adjacent the left cam ring 46. The adjustment ring 44, the left cam ring 46 and the right cam ring 48 extend about axis A-A. The adjustment mechanism 42 is mounted to the cover 32 for rotational movement therewith, but is otherwise axially movable within a limited range. As will be described, the right cam ring 48 is mounted for limited rotational movement with respect to the adjusting ring 44, the left cam ring 46, and the cover 32.

The release assembly 28 includes a sleeve 50 positioned circumferentially about the driven shaft 24. A pull assembly 52 is carried by the sleeve 50, and secured at one end thereof. A retainer 54 is secured to the opposite end of the sleeve 50, and positioned circumferentially about the sleeve 50. As shown in FIG. 3, the release assembly 28 contacts a transmission housing 55 when moved to an extreme right position (toward the direction of the arrow R). The transmission housing 55 is a stop for the release assembly 28, and defines the fully disengaged position of the clutch 20. The transmission housing 55 is in a fixed axially spaced location with respect to the flywheel 22, and permits the release assembly 28 to be returned to a control location for adjustment of the clutch 20. Another form of a stop could extend from the cover 32 to provide a control location for axial movement of the release assembly 28, the stop providing an extreme right position for the release assembly 28.

Figure 8:
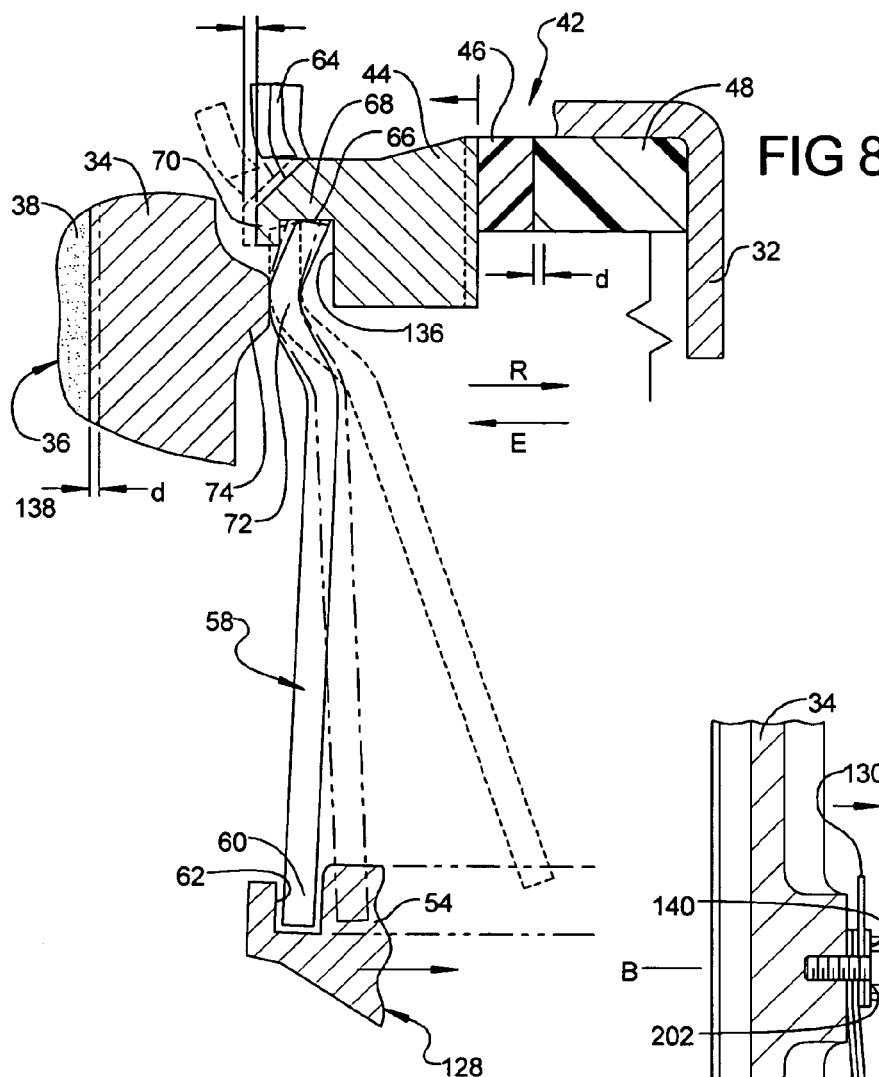
FIG. 8 is an enlarged partial cross-sectional view of a portion of the automatically adjusting clutch.

A plurality of coil springs, or biasing members, 56 are interposed between the cover 32 and the retainer 54 forming a spring assembly. As is well known in the art, coil springs 56 urge the retainer 54 in the direction E, or toward an engaged position in order to clamp the driven member 36 between the pressure plate 34 and the flywheel 22 to transfer torque from the flywheel 22 to the driven member 36. To engage and disengage the clutch, a plurality of levers 58 are radially interposed between retainer 54 and adjustment mechanism 42. As more clearly seen in FIG. 8, a radially inner portion 60 of each lever 58 is received in a peripheral groove 62 formed in the retainer 54. A radially outer portion 64 of each lever 58 has an opening 66, which receives a leftwardly (in the direction of the arrow E) projecting pivot extension 68 formed on a left face of the adjusting ring 44. The pivot extension 68 is the extreme left axial end of the adjustment mechanism 42. The pivot extension 68 further includes a radial lip 70 extending radially inwardly. The lip 70 assists in securing the lever 58 to the adjusting ring 44.

A leftwardly extending projection 72 of the lever 58 is intermediate the radially inner portion 60 and the radially outer portion 64 of each lever 58. The projection 72 pivotally and pressingly engages an annular shoulder 74 formed on the right side of the pressure plate 34. Thus, leftward movement of the release assembly 28 causes the lever 58 to apply a leftward force on the pressure plate 34 to engage the clutch members 22, 36.

Figure 4:
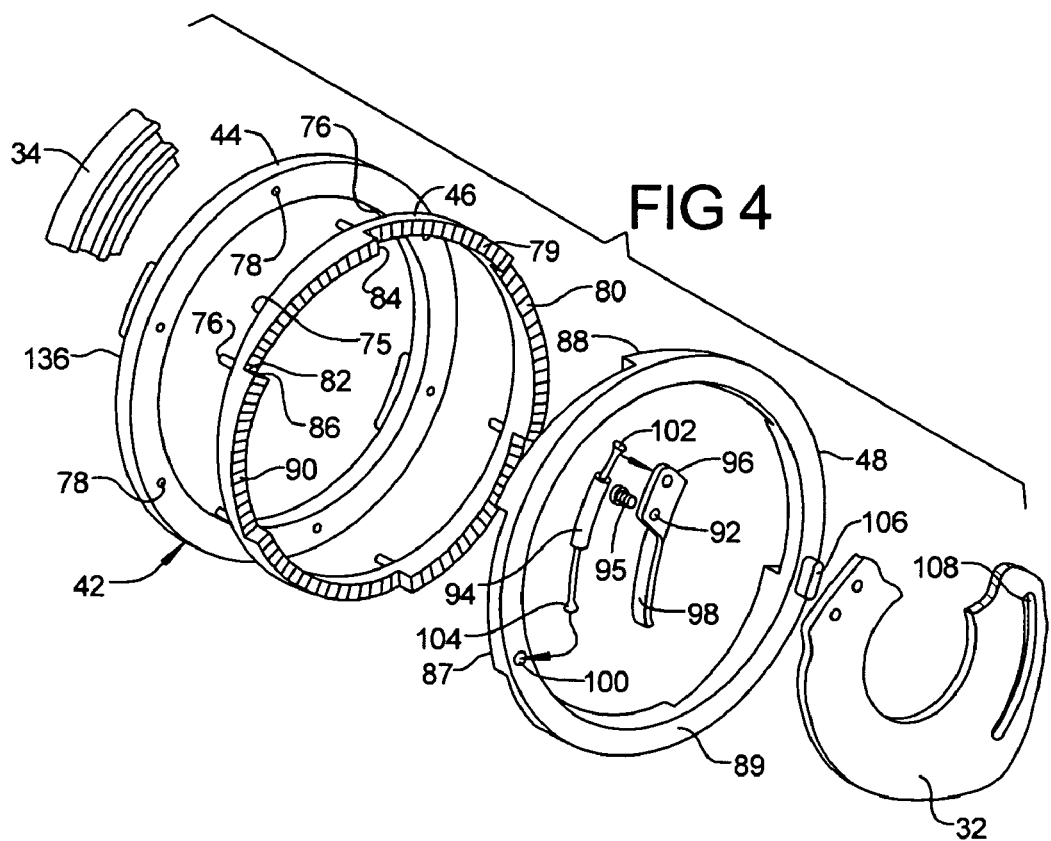
FIG. 4 an exploded perspective view of an adjustment mechanism within the clutch.
Figure 5:
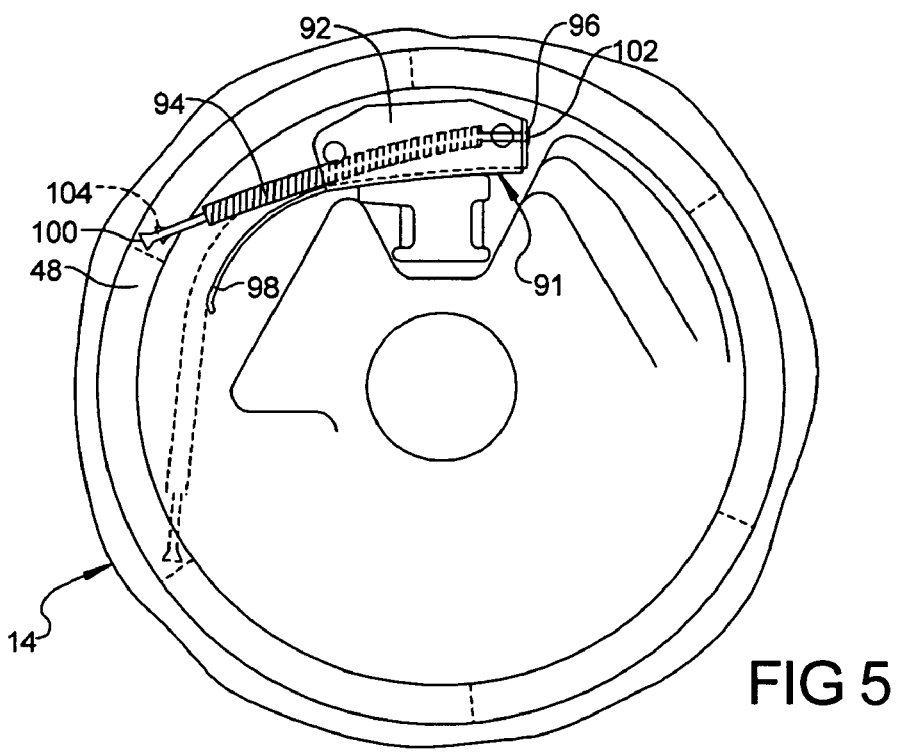
FIG. 5 is a fragmentary plan view of the adjustment mechanism.

Referring now to FIGS. 4 and 5, an axial face 75 of the left cam ring 46 includes a plurality of studs 76 each extending into a corresponding aperture 78 formed in the adjusting ring 44 to fixedly secure the left cam ring 46 to the adjusting ring 44. The adjusting ring 44 and the left cam ring 46 are rotationally fixed to the cover 32, but are otherwise permitted limited axial movement. In contrast, the right cam ring 48 is permitted limited rotational movement with respect to the cover 32.

An axial face 79 of the left cam ring 46, which is opposite the adjusting ring 44, includes a plurality of annular ramps 80. Then ramps 80 extend the full circumferential extent of the left cam ring 46. Each of the ramps 80 extends from a first axial position 82 to a second axial position 84, defining an axially extending ledge 86 in between the ramps 80.

An axial face 87 of right cam ring 48 includes a plurality of annular ramps 88. The opposite axial face 89 of the right cam ring 48 contacts the cover 32. The ramps 88 of the right cam ring 48 contact each ramp 80 of left cam ring 46 and are dimensioned and shaped to conform to the ramps 80 for camming. Further, the contacting surfaces of ramps 80 and 88 include serrations 90. Serrations 90 assist in locking the contacting surfaces together, increasing the frictional resistance between the left cam ring 46 and the right cam ring 48. Therefore, a greater force is required for the right cam ring 48 to rotate with respect to the left cam ring 46 with serrations 90 than without serrations. The serrations 90 may not be desired with all clutches.

The right cam ring 48 is biased to rotate with respect to the cover 32 by a spring assembly 91. The spring assembly 91 includes a bracket 92 and a spring 94. The bracket 92 is secured to the cover 32 by a plurality of rivets 95. The bracket 92 includes a spring seat 96 at one circumferential end and an arm 98 at the other circumferential end. The spring 94 is received radially inward of the right cam ring 48, and extends between the seat 96 of the bracket 92 and a notch 100 formed in the right cam ring 48. The bracket 92 secures one end of the spring 94, and assists in maintaining the spring 94 in a curved orientation, which provides an inner radial clearance. In so doing, the spring 94 may be placed in tension without interfering with other members of the clutch. Preferably, the spring 94 is formed from a continuous coil, wherein each end of the spring 94 is wound to flair outwardly to define a catch plate at each end of the spring 94. One end of the spring 94 forms a first catch plate 102 which is received within the seat 96 of the bracket 92; and the other end of spring 94 forms a second catch plate 104, which is received within the notch 100.

An indicator tab 106 extends from the right cam ring 48 through a circumferentially extending slot 108 in the cover 32. The indicator tab 106 indicates the amount that right cam ring 48 has rotated with respect to the cover 32, thus indicating the amount of adjustment which has occurred within the clutch 20. Further, the indicator tab 106 may be used to re-set the adjustment mechanism 42 when the friction pads 38 are replaced.

As shown in phantom in FIG. 5, counterclockwise rotation of the right cam ring 48 applies a tension to the spring 94. When under tension, the spring 94 applies a biasing force on the right cam ring 48 so that the right cam ring 48 rotates with respect to the left cam ring 46 under conditions required for adjustment. As the right cam ring 48 rotates clockwise, the ramps 80 and 88 cam against each other, moving the adjusting ring 44 from a first axial position to a second axial position, the second axial position being spaced a greater axial distance from the wall 33 of the cover 32 than the first axial position. The camming thereby increases an axial displacement of the left cam ring 46 and the right cam ring 48. The mechanism 42 is designed to stop adjusting when the clutch pads 38 are fully worn. When the clutch pads 38 are fully worn, the tab 106 contacts an end of a slot 108 to prevent further rotation of the right cam ring 48.

Figure 6:
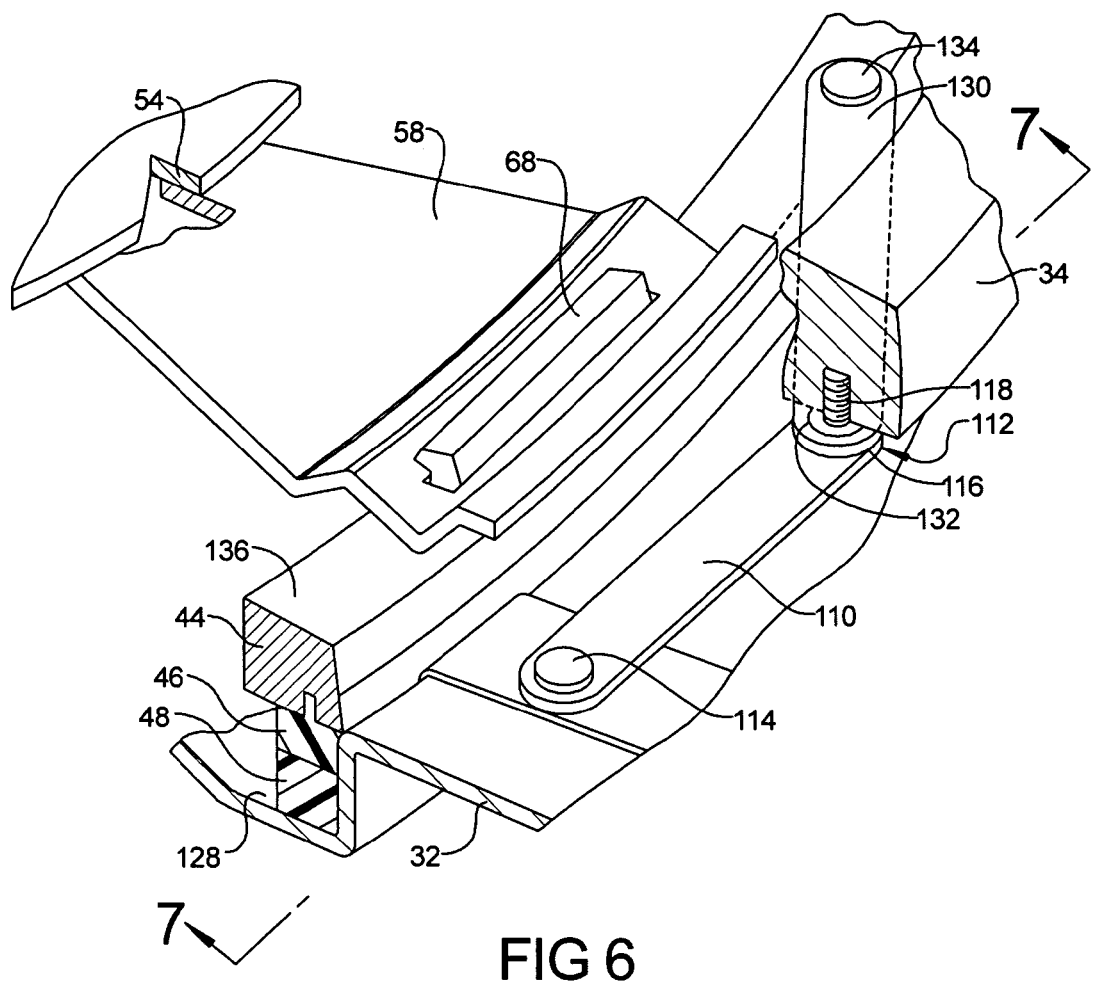
FIG. 6 is a fragmentary perspective view of the automatically adjusting clutch.

As illustrated in FIGS. 3 and 6, the pressure plate 34 is attached to the cover 32 by a plurality of straps 110 and a plurality of pin connection assemblies 112. For convenience, although a plurality of straps 110 and pin connection assemblies 112 are circumferentially spaced about the cover 32, only one set will be described. In the embodiment illustrated, four pin connection assemblies 112 are spaced about 90 degrees apart on the cover 32. Each strap 110 extends in a generally circumferential orientation with respect to the cover 32. A first end 114 of strap 110 is attached to the cover 32, while a second end 116 is attached to the pressure plate 34 at a location spaced from the first end 114. The strap 110 is sufficiently flexible to allow the pressure plate 34 to be moved axially with respect to the cover 32, but is otherwise sufficiently rigid to prevent rotation of the pressure plate 34 with respect to the cover 32.

Figure 7:
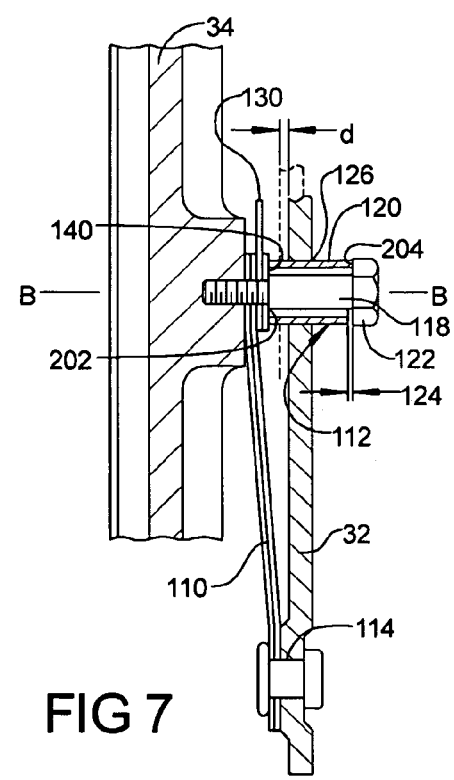
FIG. 7 is a partial sectional view of the automatically adjusting clutch, including a connection pin assembly, taken along line 7-7 of FIG. 6.

As more clearly seen in FIGS. 3 and 7, each pin connection assembly 112 includes a pin 118 and a pin housing 120. The pin 118 is threadably received in a radially outer portion of the pressure plate 34. An opposite end of the pin 118 includes an enlarged head 122. The pin housing 120 extends circumferentially about the pin 118 between the pressure plate 34 and the head 122.

A slight clearance 124 is provided between the pin housing 120 and the head 122 of the pin 118 permitting the pressure plate 34 a small amount of relative movement. The pressure plate 34 is thereby freely movable an axial distance defined by clearance 124. During normal operation, the clearance 124 permits sufficient axial movement of the pressure plate 34 with respect to the cover 32 to engage and disengage the clutch 20. The pin housing 120 is received in a generally cylindrical aperture 126 of the cover 32, forming an interference fit between the outer dimension of the pin housing 120 and aperture 126, as discussed in greater detail below. The pressure plate 34 is movable an additional axial distance defined by the axial dimension of the pin housing 120, assuming the force is sufficient to overcome the interference fit between the pin housing 120 and the cover 32 and move the pin housing 120 in the direction of the arrow E. In the embodiment illustrated, the cover 32 is a stamped assembly, although in other embodiments the cover 32 may include a cast portion with the apertures 126 formed therein.

FIG. 7 illustrates a radial cross-section of pin connection assembly 112 and strap 110. The clutch 20 is shown in the disengaged position, so clearance 124 is between head 122 of the pin 118 and the pin housing 120.

Referring again to FIGS. 3 and 6, the adjustment mechanism 42 is seated in an annular cavity 128 formed in the cover 32 and secured to the cover 32 by a strap 130. For convenience, although a plurality of straps 130 are circumferentially spaced about the cover 32, only one will be described. Each strap 130 extends in a generally circumferential orientation with respect to the cover 32. A first end 132 of each strap 130 is attached to the pressure plate 34 by a pin 118, while a second end 134 is attached to an axial face 136 of the adjusting ring 44 at a location spaced from the first end 132. Further, the second end 134 of each strap 130 is located radially inwardly of the first end 132. Each strap 130 is sufficiently flexible to allow adjusting ring 44 to be moved axially with respect to the cover 32 and the pressure plate 34, but is otherwise sufficiently rigid to prevent rotation of adjusting ring 44 with respect to the cover 32. The right cam ring 48, which is not directly secured to the adjusting ring 44 or the left cam ring 46, is sandwiched between the cover 32 and the left cam ring 44.

The straps 130 serve an additional purpose which is to bias the adjusting ring 44 towards the lever 58 (in the direction of the arrow E in FIG. 3). Thus, the axial face 136 of the adjusting ring 44 applies a force on lever 58 in the direction of the arrow E. Such force maintains the lever 58 in contact with the pressure plate 34. Therefore, if the release assembly 28 is moved to an extreme right position (in the direction of the arrow R in FIG. 3), a gap will be created between left cam ring 46 and right cam ring 48, as opposed to lever 58 and the pressure plate 34. The significance of this will become apparent once the interaction of the lever 58 and the adjustment mechanism 42 ring is understood.

FIGS. 10-13 illustrate the pin housing 120 in greater detail. The pin housing 120 includes a generally tubular body 200 generally defining an axis B-B and having a first end 202, a second end 204, a generally cylindrical outer surface 206, a generally cylindrical inner surface 208, an axially extending break 210 generally defined by a generally radially extending first surface 212 and a generally radially extending second surface 214. The pin housing 120 also includes a first groove 220 and a second groove 222. The first groove 220 and the second groove 222 segregate the unitary pin housing 120 to define a circumferentially extending first end arm 230, a circumferentially extending second end arm 232, a first end transition 234, an intermediate arm 236, a first intermediate transition 238, and a second intermediate transition 240. The first groove 220 is defined by a first end arm annular surface 250, a second end arm annular surface 252, a generally annular first body surface 254, a generally annular second body surface 256, a first transition surface 258, and a second transition surface 260. The second groove 222 is defined by a generally annular first end surface 270, a generally annular second end surface 272, a second groove first transition surface 274, and a second groove second transition surface 276.

Figure 12:
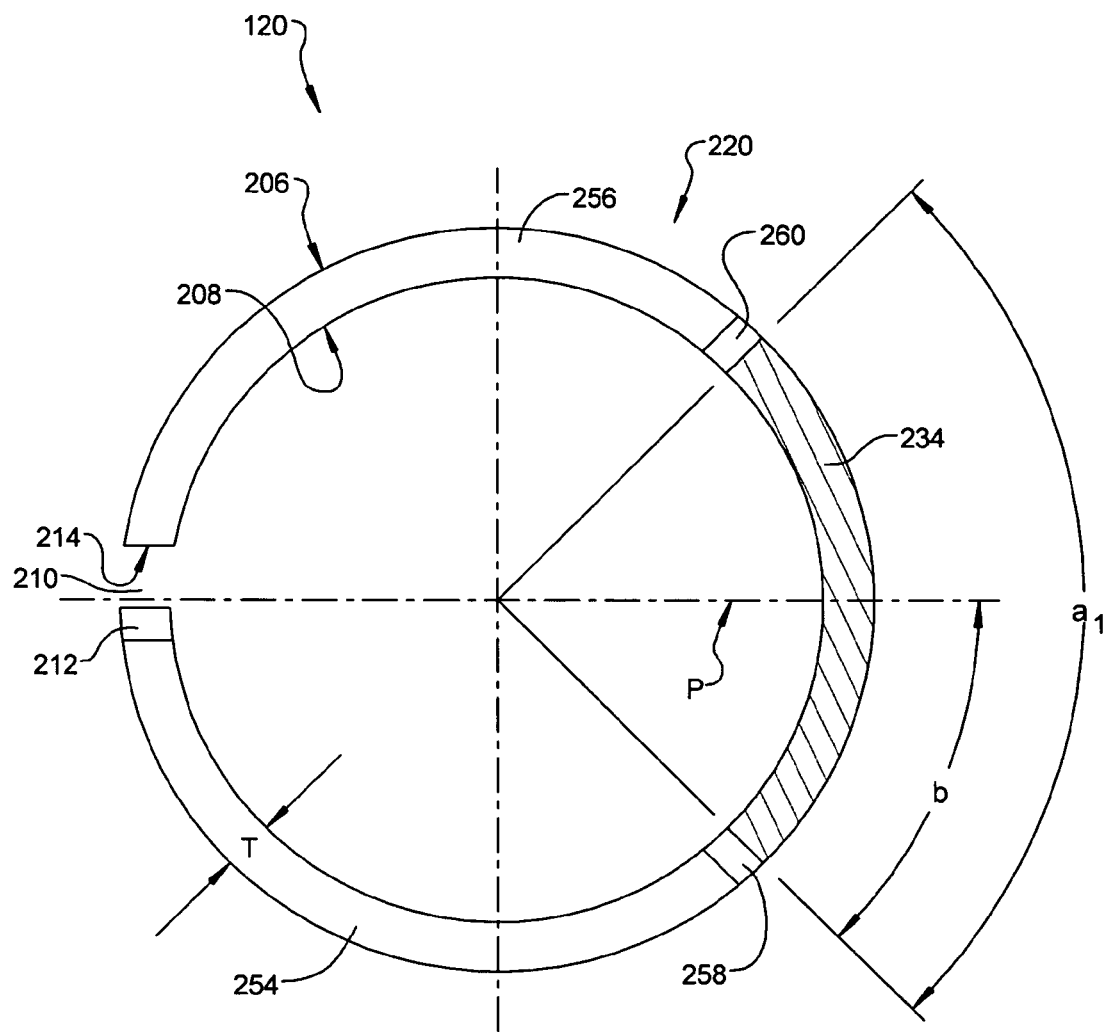
FIG. 12 is a sectional view of the spring of FIG. 11, taken along line 12-12 of FIG. 11.
Figure 13:
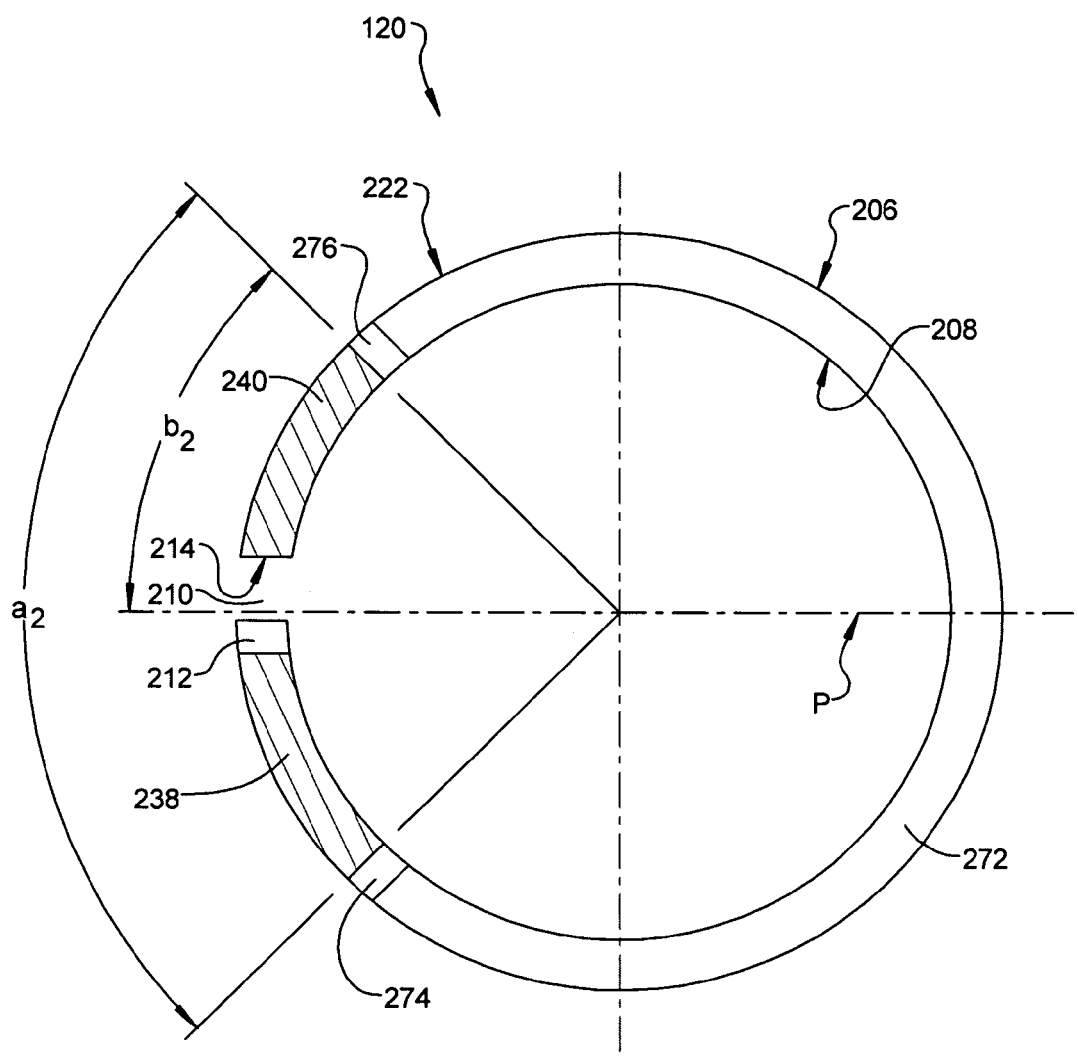
FIG. 13 is a sectional view of the spring of FIG. 1, taken along line 13-13 of FIG. 11.

As best seen in FIG. 12, the first groove 220 extends around the circumference of the body 200 an angle of $(360-\alpha_1)$ degrees (the arc between the first transition surface 258 and the second transition surface 260). Accordingly, the first end transition 234 extends $\alpha_1$ degrees around the body 200. The second groove 222 extends around the circumference of the body 200 an angle of $(360-\alpha_2)$ degrees (the arc between the second groove first transition surface 274 and the second groove second transition surface 276). Accordingly, the first end transition 274 extends $\alpha_2$ degrees around the body 200.

Figure 11:
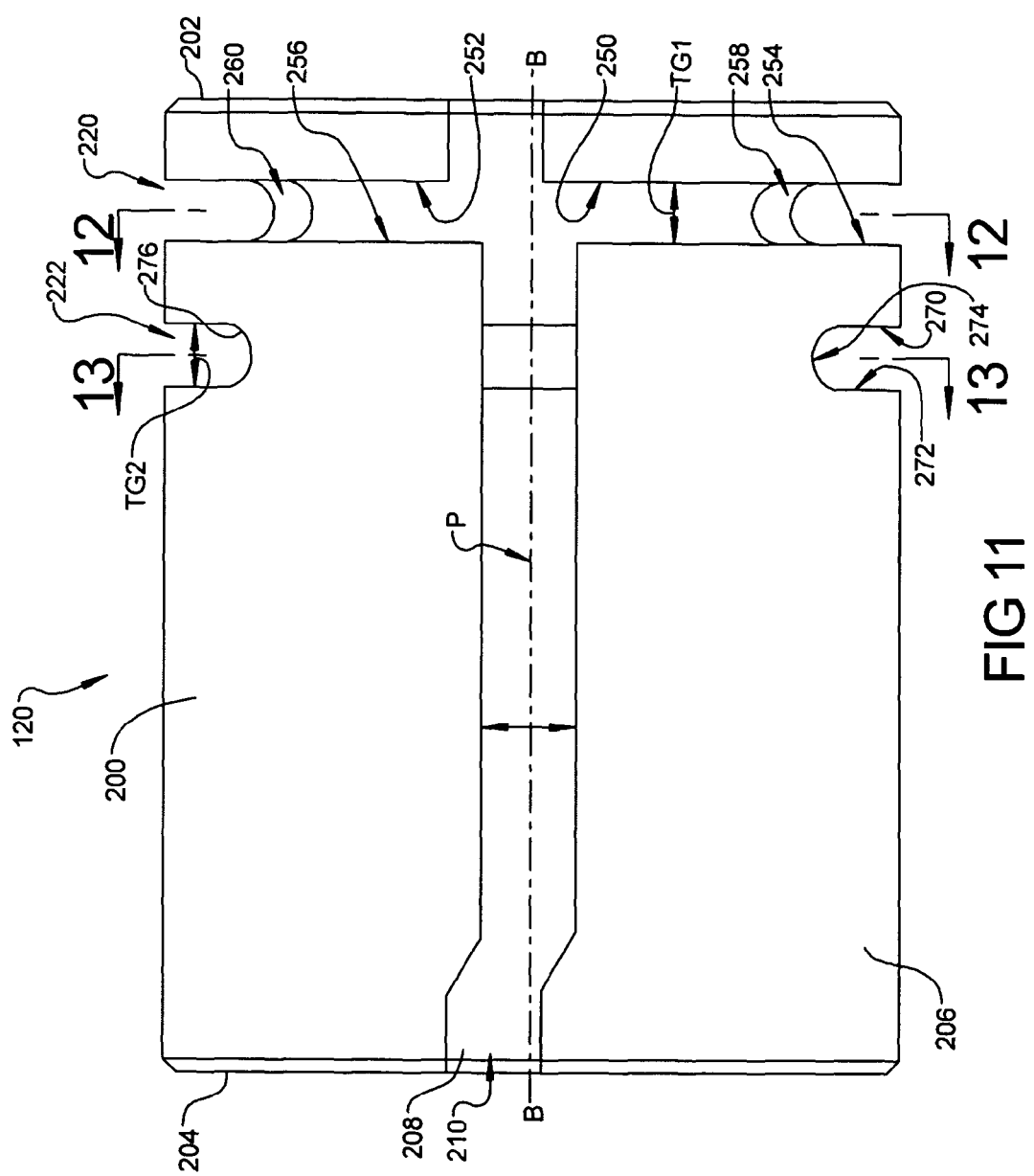
FIG. 11 is a side view of a spring of FIG. 10.

For comparison purposes, the axis B-B lies in a plane P (FIGS. 11-13) which extends through the break 210. The first transition surface 258 is positioned from the plane P by an angle of $\beta_1$ degrees. The second groove second transition surface 276 is positioned from the plane P by an angle of $\beta_2$ degrees. As best seen in FIGS. 10 and 11, the first groove 220 is staggered from the second groove 222 such that the first groove 220 and the second groove 222 permit axial deflection of the first end 202 toward the second end 204. Further, the deflection of the first end 202 toward the second end 204 may resiliently deflect the transitions 234, 238, 240.

In the embodiment illustrated, the pin housing is made of a steel, such as a hardened and tempered SAE 1070-1080 steel, although other materials may be used. Also in the embodiment illustrated, the angle $\alpha_1$ is about 90 degrees, the angle $\beta_1$ is about 45 degrees, the angle $\alpha_2$ is about 100 degrees, and the angle $\beta_2$ is about 50 degrees.

In the exemplary embodiment illustrated, the pin housing 120 has a thickness TB (FIG. 12), measured generally perpendicular to the axis B-B and between the outer surface 206 and the inner surface 208. The first groove 220 is defined by an axial thickness TG1 measured axially between the surfaces 250 and surface 254 (or surface 252 and surface 256). The second groove is defined by an axial thickness TG2 measured axially between surface 270 and surface 272.

The body 200 forms a unitary piece spring that is biased radially outwardly due to the break 210 when not interposed within an aperture 126 to define an outer diameter larger than the diameter of the aperture 126. The pin housing 120 is interposed within one of the cover apertures 126 such that the outer surface 206 is in an interference fit with the aperture 126 as the first surface 212 and the second surface 214 are brought together. That is, when the pin housing 120 is interposed within an aperture 126, the first surface 212 and the second surface 214 are biasingly urged apart by the body 200 causing the pin housing 120 to be forced radially toward the aperture 126 to resist axial movement therebetween, thereby requiring an axial force to move the pin housing 120 axially within the aperture 126.

As discussed in greater detail below, as the clutch friction surface 40 wears, the pin housings 120 will move axially within the apertures 126 to permit automatic adjustment of the clutch and help ensure that the coil springs 56 will exert a sufficient amount of force on the pressure plate 34 to engage the clutch. That is, a distance d (FIG. 7) is maintained since the pin housing 120 moves in the direction of the arrow E as the friction surfaces 40 wear. One feature of the distance d is that the pressure plate 34, when moved toward the pin housings 120 in the direction of the arrow R, is restrained by the pin housings 120 in a 'centered' position where the periphery of the pressure plate 34 is generally equidistant from the flywheel 22. This 'centered' position reduces premature wear and drag of the friction pads 38 which may heat the friction pads 38 and reduce the clamping force of the clutch 20. As best seen in FIG. 3, if the pin housings 120 were not permitted to axially move within the apertures 126, the heads 122 of the pins 118 would restrain the pressure plate 34 from moving sufficiently toward the flywheel to clamp the friction disks 38.

The pin housing 120 may also provide an axial biasing force due to the grooves 220, 222. That is, when the first end 202 contacts a component of the clutch 20 during movement of the pressure plate 34 and the pin 118 relative to the cover 32, the pin housing 120 will exert a biasing force in the direction of the arrow E. This biasing force will slow the pressure plate 34 as the pressure plate 34 stops moving in the direction of the arrow R due to the interference with the pin housings 120. If the force exerted by the pressure plate 34 in the direction of the arrow R were to exceed the amount of force required to axially move the pin housing 120 relative to the cover 32, then the pin housing 120 may undesirably move in the direction of the arrow R relative to the cover 32.

The dimensions of the pin housing 120 and material may be selected to provide a desired amount of axial biasing force and a desired amount of radial biasing force. Specific factors that determine these forces is the amount of area of contact between the pin housing 120 and the aperture 126, the material of the pin housing, and the thickness TB of the pin housing. The thickness TG1 of the first groove 220 and the thickness TG2 of the second groove 222, at least in part, determine the axial biasing force. Accordingly, the pin housing 120 may be dimensioned to provide a desired amount of radial biasing force and a desired amount of axial biasing force, as desired, where the radial biasing force is independent of the axial biasing force. In contrast, a helical spring may provide both a radial biasing force and an axial biasing force, but these forces are mutually dependent.

As best seen in FIG. 3, the clutch 20 is disengaged by movement of the release assembly 28 in the direction R, and more specifically, movement of retainer 54 in the direction R. A fully disengaged position of the clutch 20 is defined as the position when the release assembly 28 contacts a stop, such as the transmission housing 55. In an initial condition of the clutch 20, prior to wear on friction surface 40 of the driven member 36, the retainer 54 moves a constant distance from the engaged position to the fully disengaged position of the clutch 20. Similarly, the pressure plate 34 moves a constant distance from an engaged position to a disengaged position. In this exemplary embodiment, the distance of travel for the pressure plate 34 is approximately 0.040 inch (1.02 mm), assuming no wear on the friction pads 38. As discussed in greater detail herein, the pin assembly 112 permits the pressure plate 34 to move this distance, due to the clearance 124 (FIG. 7).

After wear has occurred on the friction pads 38, the pressure plate 34 must move an additional axial distance in the direction E to engage the clutch 20 (due to interference between the head 122 of the pin 118 and the pin housing 120. This additional increment of travel is shown as "d" (when comparing the position of the pressure plate 34 to the position of the cover 32 illustrated in phantom in FIG. 7). In this intermediate condition of the clutch 20, the axial movement of the pressure plate 34 exceeds the clearance 124 provided by the pin assemblies 112. Therefore, in order for the pressure plate 34 to move the additional distance "d", the pin housing 120 is moved an axial distance "d" in the direction E relative to cover 32. The head 122 of the pin 118 applies a force on the second end 204 of the pin housing 120, as seen in FIG. 3 to move the pin housing 120 in the direction E. The pin housing 120 may then move axially in the direction of the arrow E relative to the cover 32 because the force of the coil springs 56 exceeds the resistance of the interference fit between the pin housing 120 and the cover 32. The clutch 20 will continue to operate at this position, and will remain unadjusted until the release assembly 28 is moved to a fully disengaged position. During operation, the pin housings 120 restrict the movement of the pressure plate 34 in the direction of the arrow R during each clutch disengagement.

As seen in FIG. 7, the pre-adjusted position of the cover 32 relative to the pressure plate 34 is shown in phantom. The force of the interference fit between the pin housing 120 and the cover 32 is sufficient to prevent the pin housing 120 from moving axially to the right (in the direction of the arrow R) with respect to the cover 32 during clutch disengagement (when the pressure plate 34 is moved in the direction of the arrow R such that the pressure plate will exert a force in the pin housing 120. This is due to the relatively weak force which is applied for movement of the pressure plate 34 in the direction R and the axial compliance of the pin housing 120 provided by the grooves 220, 222. In contrast, the force applied by coil springs 56 on the pressure plate 34 in the direction E is much greater, which may ensure that the pin housing 120 will always move in the direction E during operation. Accordingly, the axial compliance of the pin housing 120 may prevent the pin housings 120 from moving in the direction of the arrow R relative to the cover 32 during operation of the clutch 20.

With an electronic clutch actuator (ECA), the force exerted on the pressure plate 34 to move the pressure plate 34 in the direction of the arrow R may exceed the force applied manually by a user. In the absence of the grooves 220, 222, the pin housing is not provided with the aforementioned axial compliance. Accordingly, when the pressure plate 34 is moved in the direction of the arrow R during clutch disengagement, the pressure plate 34 may cause the pin housing 120 to move slightly in the direction of the arrow R. As the pressure plate 34 moves in the direction of the arrow E during clutch engagement, the pin housing 120 may be moved in the direction of the arrow E. If the pin housing 120 is permitted to move in both directions, the interference fit between the pin housing 120 and the aperture 126 may cause fretting which may result in an increased amount of force required to move the pin housing 120 axially within the aperture 126. The inventor has discovered that this increased amount of force required to move the pin housing 120 axially within the aperture 126 may reduce the amount of force that the coil springs 56 exert on the friction pads 38, thereby causing the clutch to slip. Accordingly, the axial compliance of the pin housing 120 reduces clutch slip and fretting between the pin housing 120 and the apertures 126 of the cover 32.

During adjustment, the pressure plate 34 exerts a force on the first end 202 of the pin housing 120 when the release assembly 28 is moved to the fully disengaged position (in the direction of the arrow R). The pin housing 120 may then prevent further movement of the pressure plate 34 in the direction of the arrow R. The strap 130 applies a biasing force on adjusting ring 44 towards the pressure plate 34. This biasing force moves the adjusting ring 44 and left cam ring 46 in the direction of the arrow E, creating gap "d". Gap "d" is created between left cam ring 46 and right cam ring 48.

In response to the gap "d," the right cam ring 48 rotates with respect to left cam ring 46 causing camming between ramps 80 and 88. This camming action locks adjusting ring 44 into the position provided by lever 58. In so doing, an extreme left axial end of adjustment mechanism is moved from a first position to a second position, the second position being spaced a greater axial distance from the cover 32 than the first position.

Figure 9A:
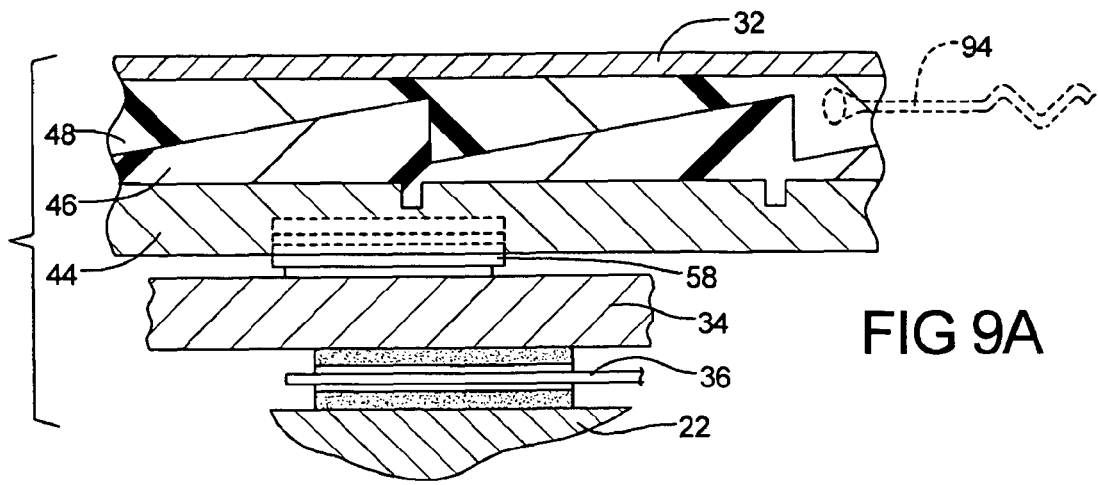
FIG. 9A is a partial radial cross-sectional view of the clutch shown in an engaged position.
Figure 9B:
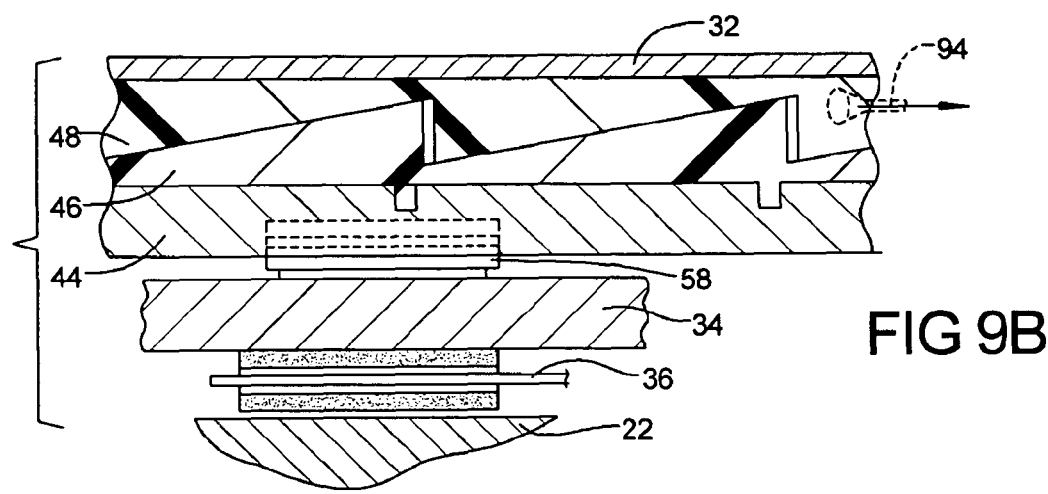
FIG. 9B is a partial radial cross-sectional view of the clutch shown in an intermediate disengaged position prior to adjustment.
Figure 9C:
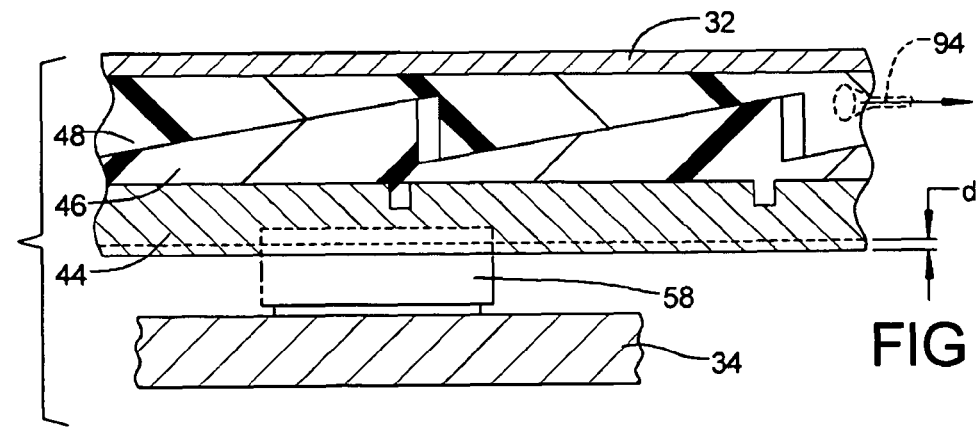
FIG. 9C is a partial radial cross-sectional view of the clutch shown in a fully disengaged position after adjustment.

Referring now to FIGS. 9A-9C, the camming action of adjustment mechanism 42 is illustrated from another cross-sectional view. Radial cross-sections of the relative position of the clutch members are shown before and after adjustment. The clutch is shown in an engaged position in FIG. 9A, after wear has occurred on friction surface 40 of driven member 36. Because of wear on friction surface 40, the pressure plate 34 has moved an additional axial distance in order to engage driven member 36 with flywheel 22.

The clutch is shown in an intermediate disengaged position in FIG. 9B. In this intermediate position, adjustment mechanism 42 has not yet been activated to adjust the clutch 20 in response to the wear on friction surface 40. The clutch will operate unadjusted until it is fully disengaged.

The clutch 20 is shown in the fully disengaged position in FIG. 9C after adjustment. When the clutch 20 is fully disengaged, pull assembly 52 of the release assembly 28 contacts transmission housing 55, which is the extreme right position for the release assembly 28, as shown in FIG. 3. The radially outer portion 64 of lever 58 leverages adjusting ring away from the cover 32, and creates a gap between left cam ring 46 and right cam ring 48. The biasing forces on right cam ring 48 caused by spring 94 urges the rotation of right cam ring 48. This, in turn, results in camming along ramps 80 and 88 to increase the axial displacement of adjustment mechanism 42 to fill the gap.

This action repeats each time sufficient wear has occurred on friction surface 40 to permit relative rotation of the left cam ring 46 and the right cam ring 48, and when the clutch 20 is fully disengaged. Further, this adjustment action occurs automatically during normal operation of the clutch.

Numerous advantages are achieved by the use of a clutch having the automatic adjustment mechanism as described. The adjustment of the clutch is automatically set each time the clutch is fully disengaged. The adjustment is a direct function of increased movement of the pressure plate 34 due to wear on friction surfaces, which is triggered by a pin or pin assembly that cooperates with the pressure plate 34. The increment of wear on the friction surface of driven member is directly translated into a gap between the annular cam rings, each having contacting camming surfaces. The annular cam rings cam against each other when the clutch is fully disengaged to displace this gap. Therefore, the clutch automatically adjusts over the life of the clutch and operates at peak efficiency. The adjustment mechanism is internal to the clutch, and therefore not subject to the external environment which could cause damage to the components.

The exemplary embodiment of the clutch 20 automatically compensates for wear on the mechanical linkage between clutch pedal 30 and the release assembly 28. In addition the clutch will automatically set clutch brake squeeze and compensate for wear on the clutch brake throughout the life of the clutch.

The embodiment may include the wear indicator tab so that an operator is aware of how much adjustment has taken place, and can estimate the remaining life of the clutch. This visual indicator is outside the clutch, and provides this information without disassembly of the clutch. Further, the adjustment mechanism compensates for manufacturing variations in the cover assembly allowing the clutch to be initialized upon the first full disengagement.

Further, in the first embodiments the set of straps which secure the pressure plate 34 to the adjustment mechanism also maintains the lever against the pressure plate 34. Therefore, noise is reduced or eliminated due to vibration that may otherwise occur between the pressure plate 34 and the lever. Further, wear on the shoulder 74 of the pressure plate 34 is reduced due to the decreased vibration of lever 58.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A torque transmitting apparatus comprising:
   a cover portion generally defined by a first axis, wherein the cover portion includes a plurality of adjustment apertures;
   a flywheel coupled to the cover portion for rotation therewith, wherein the flywheel is restrained from axial movement relative to the cover portion;
   a pressure plate coupled to the cover portion for rotation therewith, wherein the pressure plate is axially moveable relative to the cover portion;
   a clutch disk at least partially interposed between the flywheel and the pressure plate; and
   a plurality of first members, wherein each first member is interposed within at least one of the adjustment apertures of the cover, wherein each first member exerts a biasing outward radial force on the adjustment aperture to resist axial movement therebetween, and wherein a portion of the first member exerts a biasing axial force on the pressure plate thereby biasing the pressure plate toward the flywheel.

2. The apparatus of claim 1, further comprising a second member interposed within at least one of the first members.

3. The apparatus of claim 2, wherein the second member is coupled to the pressure plate.

4. The apparatus of claim 1, wherein each first member is constructed as a unitary portion.

5. The apparatus of claim 1, further comprising a plurality of second members, wherein each second member is interposed within one of the first members.

6. The apparatus of claim 1, wherein the first member moves toward the flywheel as the clutch pad is reduced in axial thickness through wear.

7. The apparatus of claim 6, wherein the pressure plate, when in an engaged position, moves toward the flywheel as the clutch pad is reduced in axail thickness through wear, and wherein the movement of the pressure plate toward the flywheel is about equal to the movement of the first member toward the flywheel.

8. The apparatus of claim 1, wherein each first member is interposed within one of the adjustment apertures in an interference fit.

9. The apparatus of claim 1, further comprising a biasing member for biasing the pressure plate toward the flywheel when torque is being transferred from the flywheel to the clutch disk.

10. A method of operating a clutch comprising:
disengaging the clutch by moving a pressure plate toward a cover such that the pressure plate exerts a force on a plurality of first members, wherein the pressure plate moves between a first position where the pressure plate is restrained from axial movement by a clutch disk, and a second position where the pressure plate is restrained from axial movement by the plurality of first members;
biasing the pressure plate toward a flywheel when torque is being transferred from the flywheel to the clutch disk with a biasing member; and
biasing the pressure plate toward the flywheel when torque is not being transferred from the flywheel to the clutch disk with an axially resilient portion of the first members.

11. The method of claim 10, further comprising interposing one of the first members within an aperture of a clutch cover for exerting a resiliently biased radial force on a the clutch cover, wherein the clutch cover is coupled for rotation with the flywheel and the pressure plate.

12. The method of claim 10, further comprising biasing the pressure plate toward the flywheel with axial translation of a clutch release assembly.

13. The method of claim 10, wherein disengaging the clutch includes moving the pressure plate toward the cover such that the pressure plate exerts a force on the first members.

14. The method of claim 10, further comprising adjusting the pressure plate to a position closer to the flywheel as a portion of the clutch disk wears by moving the plurality of first members toward the flywheel as an axial thickness of the clutch disk is reduced.

15. The apparatus of claim 10, further comprising transferring torque from the flywheel to the clutch disk, wherein the clutch disk is interposed between the flywheel and the pressure plate.

16. A method of operating a clutch, comprising:
disengaging the clutch by moving a pressure plate a predetermined axial distance relative to a flywheel, wherein the pressure plate moves between a first position where the pressure plate is restrained from axial movement by a clutch disk, and a second position where the pressure plate is restrained from axial movement by a plurality of first members;
transferring torque from the flywheel to the clutch disk, wherein the clutch disk is interposed between the flywheel and the pressure plate;
adjusting the pressure plate to a position closer to the flywheel as a portion of the clutch disk wears by moving the plurality of first members toward the flywheel as an axial thickness of the clutch disk is reduced; and
biasing the pressure plate toward the flywheel when torque is not being transferred from the flywheel to the clutch disk, wherein biasing the pressure plate is performed by an axially resilient portion of the first members.

17. The method of claim 16, further comprising interposing one of the first members within an aperture of a clutch cover for exerting a resiliently biased radial force on a the clutch cover, wherein the clutch cover is coupled for rotation with the flywheel and the pressure plate.

18. The method of claim 16, further comprising biasing the pressure plate toward the flywheel with axial translation of a clutch release assembly.

19. The method of claim 16, wherein disengaging the clutch includes moving the pressure plate toward the cover such that the pressure plate exerts a force on the first members.

20. The method of claim 16, further comprising biasing the pressure plate toward a flywheel when torque is being transferred from the flywheel to the clutch disk with a biasing member.

* * * * *